United States Patent [19]
Hankins

[11] 3,913,866
[45] Oct. 21, 1975

[54] CROSS COUPLED REELS SYSTEM

[75] Inventor: Frederick E. Hankins, Flemington, N.J.

[73] Assignee: Lockheed Electronics Company, Inc., Plainfield, N.J.

[22] Filed: Nov. 1, 1973

[21] Appl. No.: 411,686

[52] U.S. Cl. ............ 242/191; 242/75.51; 242/209; 318/7

[51] Int. Cl.² ................ G11B 19/28; B65H 25/22; B65H 25/16

[58] Field of Search ..... 242/191, 186, 75.51, 75.52, 242/75.53, 75.5, 189, 190, 201, 206, 209, 75.44; 318/6, 7

[56] References Cited

UNITED STATES PATENTS

| | | | |
|---|---|---|---|
| 3,582,743 | 6/1971 | Diaz et al. | 242/75.51 |
| 3,704,401 | 11/1972 | Miller | 242/75.51 |

OTHER PUBLICATIONS

Van Winkle – "Control Tension Gradient Rewind System" I.B.M. Technical Disclosure Bulletin, p. 23, Vol. 2, No. 6, April, 1960.
Weidenhammer – "Electrical Differential Tape Drive System" I.B.M. Technical Disclosure Bulletin, p. 1805, Vol. 12, No. 11, April, 1970.

*Primary Examiner*—George F. Mautz
*Attorney, Agent, or Firm*—Billy G. Corber; Albert K. Geer

[57] ABSTRACT

A magnetic tape recorder system which provides constant tape tension independent of reel diameter and eliminates tension sensing devices. A signal proportional to the angular velocity of the supply and take-up reels is generated at each reel and supplied to a torque device at the other reel.

5 Claims, 2 Drawing Figures

CROSS COUPLED REELS SYSTEM

The invention relates to apparatus for controlling the tension in material which is fed from a supply reel or the like and more particularly to controlling tape tension in a magnetic tape recorder.

There are many instances where maintenance of a constant tension in material, which is unwound from a supply reel, bobbin or spool and transferred to another reel or to a work station, is highly desirable. In the tape recorder art, the environment in which the invention is particularly applicable, many tape recorders utilize motors or motors and brakes to apply torque to the tape storage or supply reels. Typically, the take-up reel on which the tape is being wound is driven by a motor either directly or via belts or gears to take up the tape and to provide tension in the tape as required for effective winding and definition of the tape path. The tape supply reel generally has a torque applied to it in a direction opposing its direction of rotation to provide tape tension. This back or opposing torque is usually supplied by a brake, friction, hysteresis or by a motor either directly or by belts or gears.

Other prior art systems find it necessary to employ extensive servomechanisms, speed and tension sensors, elaborate mechanical couplings, guides and other complex systems in addition to the basic drive system. Spring coupled reels are also well known, but are limited as to the quantity of tape which can be used.

For effective operation of the tape recorder and for proper handling or transport of the magnetic tape, the tape tension must be kept within limits imposed by the physical characteristics of the tape. In addition, often an isolation is desired between the motor/inertia systems controlling the reels and the motor/inertia systems controlling, metering or establishing the desired constancy of tape speed. This isolation is desired for one or both of two principal reasons:

A. To isolate the tape metering region, controlling tape speed across the magnetic heads, from perturbations and spurious disturbances originating in the reels systems.

B. To uncouple the tape metering torque/inertia system from the reels torque/inertia system so that rapid start-stops of tape in the heads region do not lead to undesirable slack and undefined tape guidance in the region of the tape reels.

It is therefore a principal object of the invention to provide an improved tape or web tension controlling system.

A further object of the invention is to provide a reeling system for recorders which delivers constant tape tension regardless of reel diameter and which eliminates tension sensing devices.

Another object of the invention is to provide a constant tension controlling system which minimizes mechanical complexity.

Another object of the invention is to provide a reeling system which permits a large tape reel full diameter to empty diameter ratio and maximum tape length for a given recorder volume and reels orientation.

These and other objects of the invention will become apparent from the following description when taken with the accompanying drawings, in which.

Figure 1:
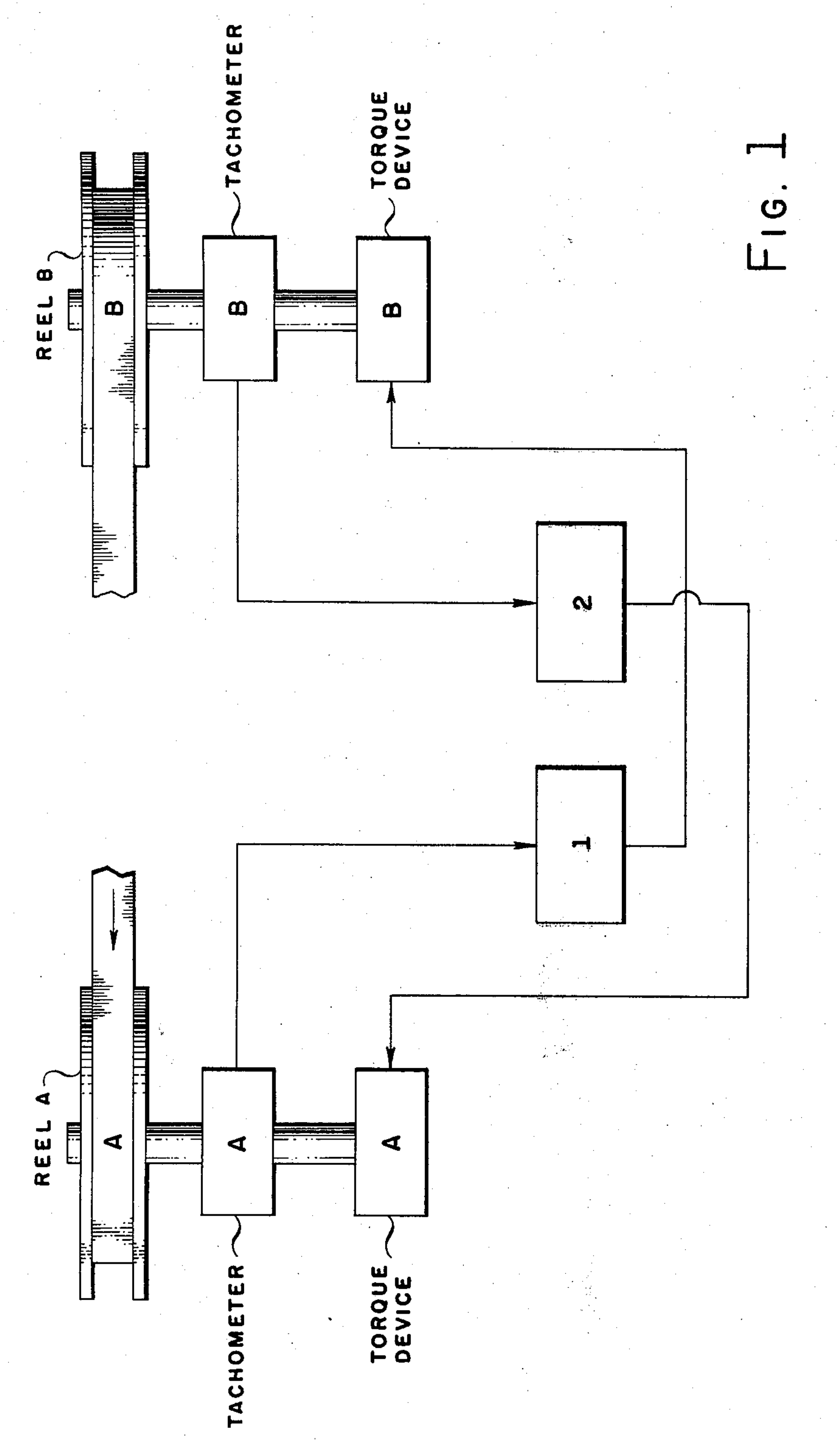
FIG. 1 is a diagrammatic view of an embodiment of the invention.

Broadly, the invention utilizes information derived from one reel to control the torque applied to the other reel, and vice versa. The information generated from the reels may be used also for other useful purposes as will be explained. "Cross coupling" as used herein is basically the means used to torque the reels to provide the desired constant tension and path definition for tape to the take-up reel and path definition from the supply reel.

For a better understanding of the invention, a brief discussion of the theory of operation will now be presented. Let subscript A be used for the take-up reel and B for the supply reel, although the rules can be reversed since the system is symmetrical or mirrored. The following symbols have the designated meanings:

$D_A$ = Diameter of the take-up reel
$D_B$ = Diameter of the supply reel
$V$ = linear velocity of the tape
$\omega_A$ = angular velocity of the take-up reel in radians/-second
$\omega_B$ = angular velocity of the supply reel in radians/-second
$F$ = tape tension from supply reel to take-up reel
$T_A$ = wind-on torque applied to the take-up reel
$T_B$ = restraining torque applied to the supply reel It is common knowledge that $$V=\omega r,$$

or stating it another way and where the linear velocity ($V$) is constant, $$V=\omega_A \frac{D_A}{2}=\omega_B \frac{D_B}{2},$$

from which, $$\omega_A D_A=\omega_B D_B \quad (1)$$

which means that for a constant linear velocity of tape between reels, as tape is removed from one reel its diameter decreases with an increase in angular velocity whereas tape is added to the other reel with an increase in diameter and a decrease in angular velocity.

It is also well known that the torque ($T$) and tension ($F$) have the following relation $$T=Fr=F\frac{D}{2}$$

Thus $$T_A=F\frac{D_A}{2} \text{ and} \quad (2)$$

$$T_B=F\frac{D_B}{2} \quad (3)$$

For constant tape tension ($F$), from equations (2) and (3),

-Continued $$F = \frac{2T_A}{D_A} = \frac{2T_B}{D_B} \quad (4)$$

combining (1) and (4)

$$\frac{\omega_A}{B} = \frac{D_B}{D_A} = \frac{T_B}{T_A} \text{ or} \quad (5)$$

$$\frac{\omega_A}{B} = \frac{T_B}{T_A} \quad (6)$$

where $\omega$ is in RPM's — revolutions per minute.

Simply stated, $$\frac{\text{RPM's of reel } A}{\text{RPM's of reel } B} = \frac{\text{Torque to reel } B}{\text{Torque to reel } A}$$

Thus, a signal proportional to the speed of reel $A$ (tachometer or equivalent) may be used to control the torque applied to reel $B$, and vice versa. It should be noted that equation (6) is independent of diameter.

Referring now to FIG. 1, reels A and B are disposed in coplanar relationship and the tape is assumed to be traveling in the direction of the arrow, i.e., from reel B to reel A. A tachometer and torque device are associated with each reel. The tachometer signal may be derived from slots in an extended periphery of the reels and a light source and sensor (or a so-called light chopper), the output frequency being proportional to the angular speed, or an optical encoder on the reel shaft, or equivalent devices. The tachometer signal is converted to a torque signal in converters 1 and 2, and applied to the torque device of the other reel. That is, the signal from tachometer A is connected, after conversion to torque device B; the signal from tachometer B to torque device A.

Figure 2:
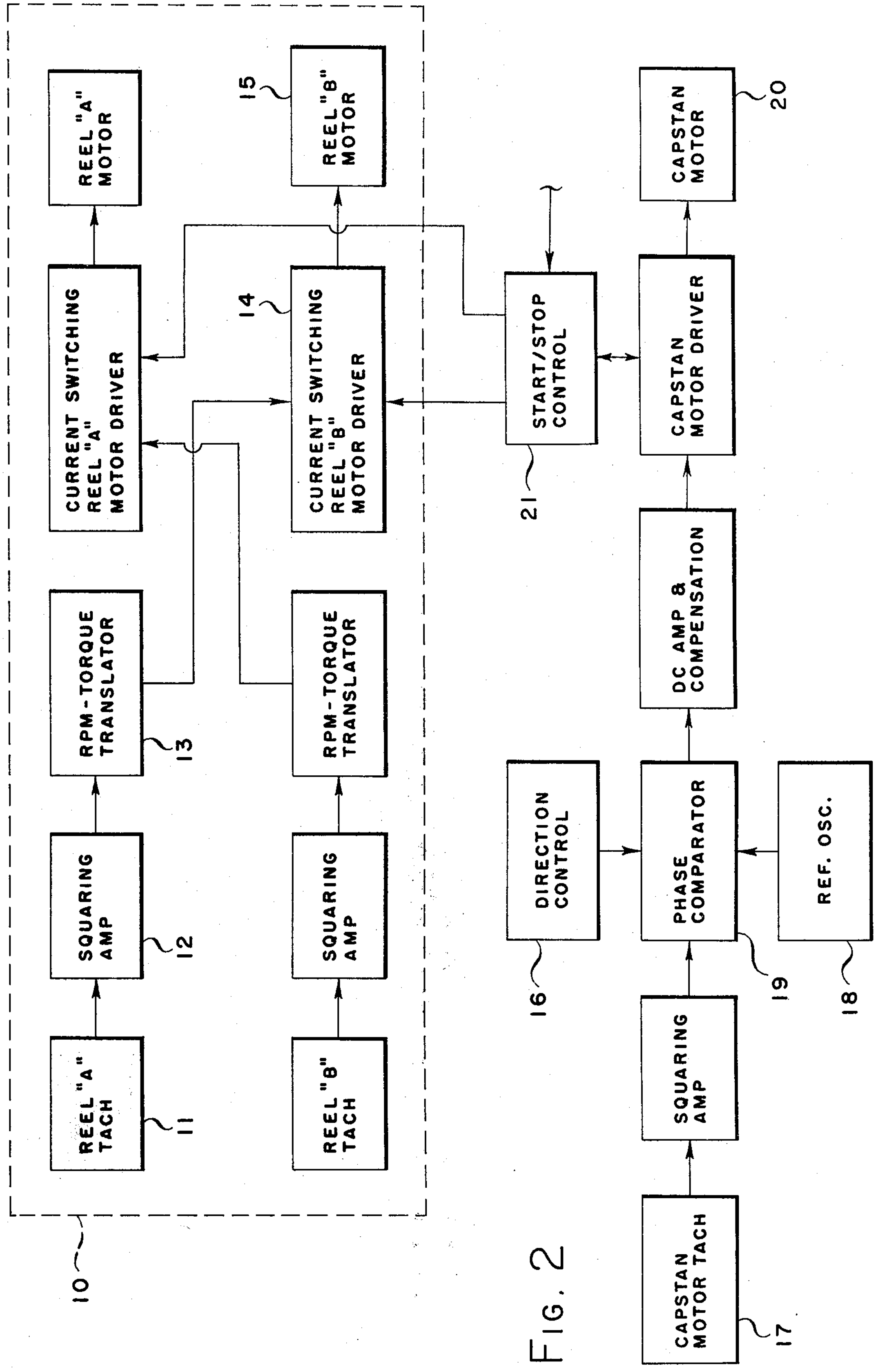
FIG. 2 is a block diagram of a tension control system in accordance with the invention, in combination with a tape drive system.

In FIG. 2, the system of FIG. 1 is shown enclosed in the broken line 10, with the reels omitted for clarity. The output of the reel A tachometer 11 is limited in squaring amplifier 12 for application to the translator or converter 13. The converter may be an FM discriminator, which, as is well known, converts the frequency deviations into a variable amplitude voltage output. The squaring amplifier defines more precisely the zero crossings in the tach signal. The translator output is connected via the motor driver 14 to reel B torque motor 15. The motor driver translates voltage to current, which in turn is proportional to motor torque. Likewise, the reel B tach signal is connected to reel A torque motor. A direction signal from direction control 16 is applied to the phase comparator 19 and determines the direction of tape motion. Since the torque polarity on each reel does not change with tape motion direction and reel tachometers do not detect direction, no polarity reversal is required for the reel drives.

The linear velocity of the tape between the reels may be provided by any conventional system which provides a constant linear velocity. One such system may be shown in FIG. 2. A signal from the capstan motor tach 17 is compared with a reference from reference oscillator 18 in a comparator 19 and the output thereof is used to actuate the capstan motor 20. It is readily apparent that other drive systems may be used to provide a constant linear velocity of the tape. During start and stop operation, the start/stop control 21 functions in the start mode to bring the reels system up to speed, i.e. the linear velocity of the tap, and simultaneously adjusts the torque signal to the reel motor drivers 14. That this is necessary is observed from equation (6), i.e. when the rotational speed increases from zero. Likewise, in the stop mode the reels will be secured against rotation, such as by means of a brake.

It can be noted from equations (5) or (6) that $$\omega_A T_A = \omega_B T_B = \text{Power}$$

which means that as the tape is transferred from the supply reel to the take-up reel, the diameter of the supply reel decreases, its angular speed increases and its applied torque decreases, whereas the diameter of the take-up reel increases, its angular speed decreases and its torque increases, i.e., the take-up reel power is equal to the supply reel (hold back) power.

From equations (1) and (5) it can be seen that the angular speed (RPM's) of reel A is directly related to the diameter of reel B and vice versa, so that the tachometer signal may also be used as, or converted to be, an indication of the tape inventory or amount of tape on the reels. That is, as the angular speed of take-up reel A decreases, the diameter of the supply reel B also decreases. Likewise, as the angular speed of the supply reel B increases, the diameter of the take-up reel increases.

It must be noted that the RPM's/torque cross coupling relationship only obtains when the magnetic tape is at the speed V. For a reel to reel tape recorder, transporting magnetic tape from one reel to the other, the mass flow of tape is a constant anywhere in the tape path and the tape velocity V is essentially a constant, varying only in the order of 0.01 to 0.03 percent depending upon the tape tension at any given point, with the velocity V slightly higher at one point than the velocity V for lower tension regions of the tape.

What is claimed is:

1. Apparatus for controlling tension in material which is fed from a supply reel or the like to a take-up reel, comprising:
- a first reel;
- a second reel;
- a shaft operatively associated with each reel for rotating the reel;
- a tachometer mounted on the shaft of each reel for sensing the reel angular velocity;
- a torque device mounted on the shaft of each reel for applying a torque load on the reel through said shaft;
- means connecting the output of the tachometer of one reel to the torque device of the other reel so as to apply a torque load on said other reel which is directly proportional to the angular velocity of said one reel; and
- capstan drive means for providing a constant linear velocity of the material from one reel to the other.

2. Apparatus as defined in claim 1, wherein said connecting means converts the angular velocity of one reel to a current proportional thereto for application to the torque device of the other reel.

3. Apparatus as defined in claim 1, wherein said capstan drive means includes a phase comparator to which is applied a signal representative of the capstan speed, a reference signal indicative of the desired speed and a direction control signal.

4. In combination with a reel to reel material transfer system and including at least two reels, drive means for transferring the material from one reel to another, a tension control system comprising:

a torque device and an angular velocity measuring device connected to each of the reels;

converter means connecting the output of the velocity measuring device of one reel with the input of the torque device of the other reel and converting a velocity signal to a torque signal proportional thereto for torquing said other reel; and direction control means associated with said drive means for driving said reels in a selected direction.

5. A tension control system for transferring material from one reel to another comprising:

at least a pair of reels;

reversible drive means for transferring material from one reel to another;

tachometer means connected to each reel;

a torque device connected to each reel; and an RPM to torque translator means responsive to the tachometer means of one reel for generating a torque signal which is proportional to RPM at said one reel at the input to the torque device of the other reel.

* * * * *